Sept. 9, 1969  R. M. KUTS ET AL  3,465,863
INDEXING APPARATUS

Filed April 3, 1968  3 Sheets-Sheet 1

INVENTORS
RICHARD M. KUTS
JOHN L. REHMAN
BY Hamilton, Cook,
Renner & Kenner
ATTORNEYS INVENTORS
RICHARD M. KUTS
JOHN L. REHMAN
BY Hamilton, Cook,
Renner & Kenner
ATTORNEYS INVENTORS
RICHARD M. KUTS
JOHN L. REHMAN
BY Hamilton, Cook,
Renner & Kenner
ATTORNEYS

United States Patent Office 3,465,863
Patented Sept. 9, 1969

1

3,465,863
INDEXING APPARATUS
Richard M. Kuts, Cuyahoga Falls, and John L. Rehman, Barberton, Ohio, assignors to The Falls Engineering & Machine Company, Cuyahoga Falls, Ohio, a corporation of Ohio
Filed Apr. 3, 1968, Ser. No. 718,631
Int. Cl. F16d 67/00, 71/00, 23/00
U.S. Cl. 192—143                                    12 Claims

ABSTRACT OF THE DISCLOSURE

A device for providing accurate indexing of machine elements through a preselected distance having a carriage mechanism selectively linearly positioned along a frame, a motor intermittently energized to linearly drive the machine elements during indexing and to linearly and proportionally displace an actuator through a clutch to engage switches mounted on the carriage which stop the motor, energize a brake on the motor, and disengage the clutch to recycle the actuator to its reference position for the subsequent indexing operation.

BACKGROUND OF THE INVENTION

Indexing apparatus is well-known in the machinery arts as equipment capable of moving a machine element, or a piece of work in relation to a machine element, so that a positioning operation is repeated at definite selected intervals. One common usage of devices of this nature is in conjunction with cutting or sawing machinery wherein a plurality of equally spaced cuts are required, such as for converting a large block of material to a number of smaller blocks having an identical dimension.

Heretofore, a variety of types of apparatus have been employed to carry out indexing functions. In a most simple form, the intervals may be spaced off by operating a hand crank or other manual device to position the mechanism by an attached pointer which can be referred to a fixed scale. However, devices of this nature are generally slow and laborious to operate and are subject to the introduction of appreciable human error by the operator.

More recently, electronic devices have been introduced which accomplish indexing by counting rotations of threaded shafts in conjunction with starting and stopping equipment. In order to provide reasonably rapid indexing, it is necessary to employ highly sophisticated electronic apparatus which maintains accuracy at relatively high shaft speeds. Electronic counting devices meeting these requirements are extremely expensive and have proven to be difficult to calibrate and maintain.

SUMMARY OF THE INVENTION

It is therefore an object of the present invention to provide mechanical apparatus which rapidly, accurately, and, if desired, automatically index machine elements or apparatus supporting a workpiece. Another object of the present invention is to provide indexing apparatus wherein the distance to be indexed may be quickly and easily preset to any of a wide range of values. A further object of the invention is to provide indexing apparatus having substantially uniform performance accuracy over its entire operating range.

It is still a further object of the invention to provide apparatus which may be adapted to index a short distance in an opposite direction to allow for clearance between a nonflexible workpiece and a machine element during a return or nonworking step in the operating cycle. Still another object of the invention is to provide indexing apparatus which is relatively uncomplex, inexpensive, and readily adaptable to a wide variety of machines having indexing requirements.

In general, indexing apparatus according to the concept of the present invention contemplates a carriage selectively linearly positioned along a frame and a motor intermittently energized to linearly displace machine elements during indexing and to linearly and proportionally displace an actuator through a clutch to engage switches mounted on the carriage which stop the motor, energize a brake associated with the motor, and disengage the clutch to recycle the actuator to its original position for a subsequent indexing operation.

DESCRIPTION OF A PREFERRED EMBODIMENT

Figure 1:
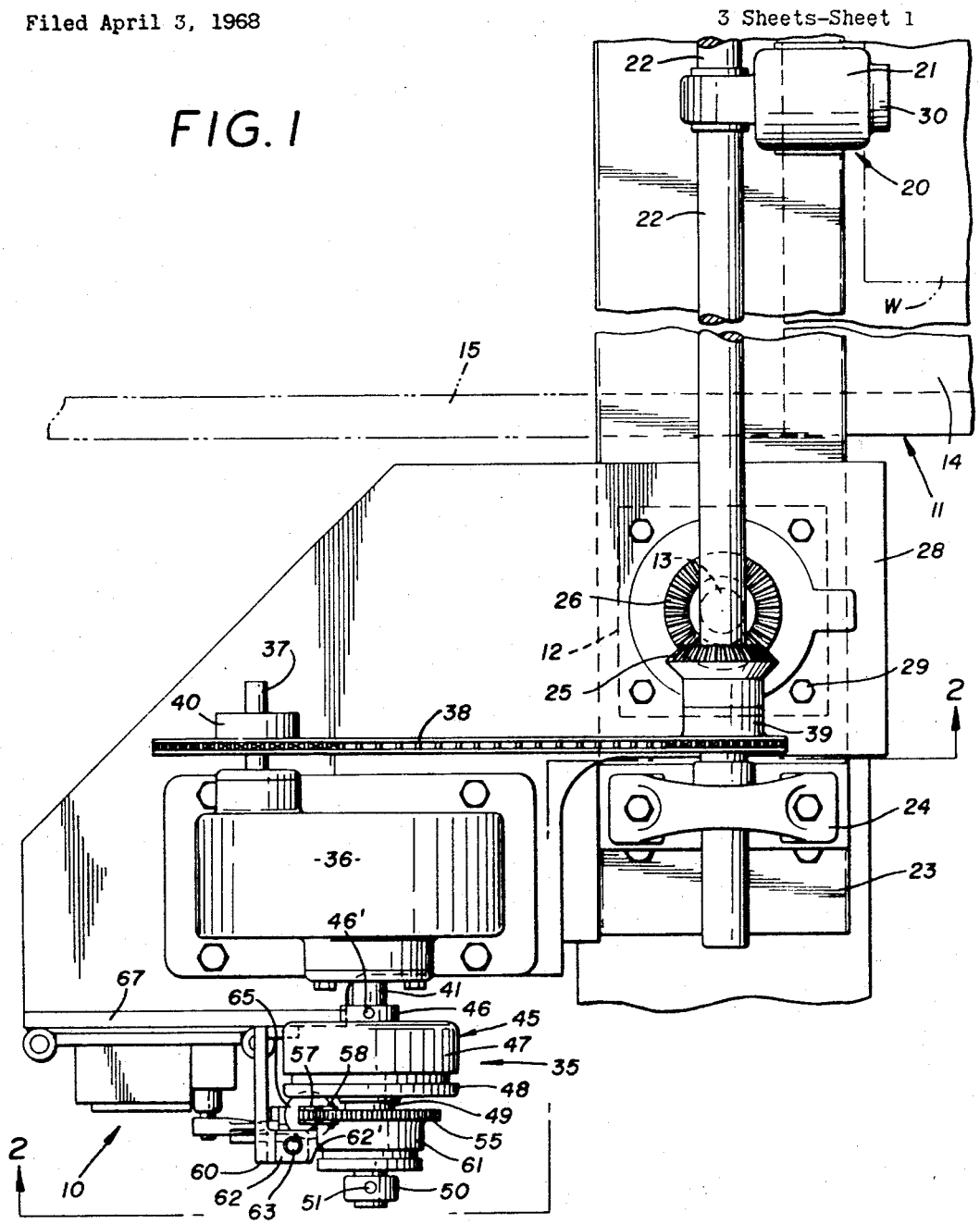
FIG. 1 is a top plan view of indexing apparatus embodying the concept of the present invention and shown in conjunction with exemplary machine elements to be indexed.

Referring more particularly to the drawings, indexing apparatus according to the present invention, generally indicated by the numeral 10, is shown in conjunction with machine elements which require indexing during their operating cycle. Although the indexing apparatus 10 of the present invention may be used in conjunction with a wide variety of machines, it is shown herein for exemplary purposes operatively connected to endless band saw or band knife machinery, generally indicated by the numeral 11 and hereinafter termed indexed machinery. The controlled components of the indexed machinery 11 are depicted herein in chain lines; however, more details of an entire apparatus of this type may be ascertained by reference to U.S. Patent No. 3,263,537 which discloses an endless band knife cutting apparatus.

As shown, the indexed machinery 11 may have a tool carrier or box 12 which appropriately supports a cutting blade or knife (not shown). The tool carrier 12 is indexed vertically up or down on a threaded screw shaft 13. Normally, a cutting blade or knife would be supported on a second side as by an identical tool carrier and threaded screw (not shown). A sliding table of conveyor 14, mounted in the horizontal cutting span of the tool carrier supported blade on one or more guide rails 15 to support a workpiece W, may be reciprocated back and forth in the cutting plane according to a programmed sequence by a suitable drive means (not shown). In the exemplary embodiment shown, the tool carrier or box 12 is indexed vertically with respect to the vertically fixed but horizontally movable table 14; however, it should be understood that a device wherein the table 14 is vertically positioned and the tool carrier supported blade remains fixed could use the concepts of the present invention.

Figure 2:
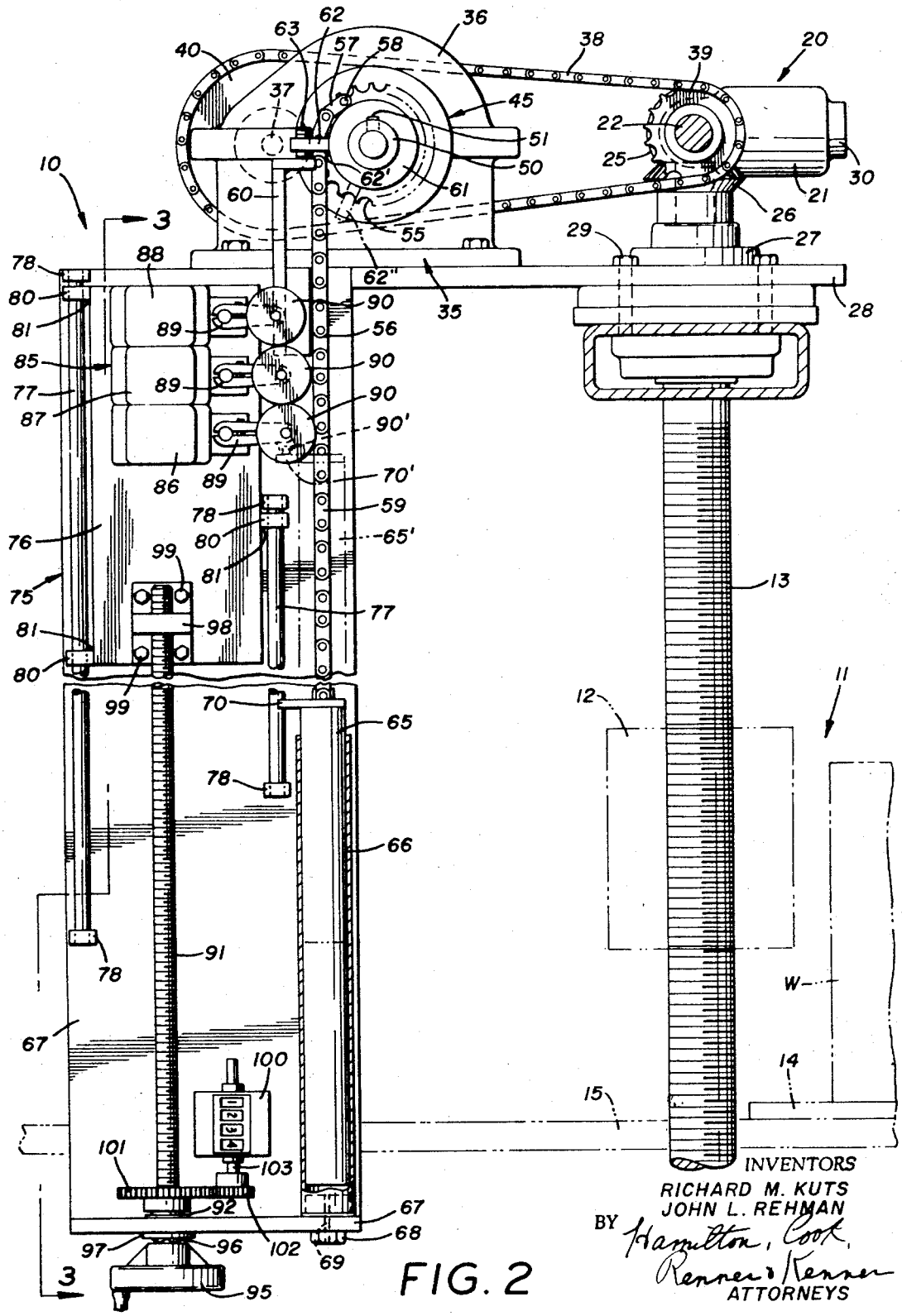
FIG. 2 is a side elevation, partly in section, as taken along line 2—2 of FIG. 1, showing the sliding carriage mounted switching devices and actuator assembly according to the present invention.

Referring to FIGS. 1 and 2 of the drawings, the tool carrier 12 is mechanically displaced by a drive assembly, generally indicated by the numeral 20, powered by a reversible electric motor 21 coupled to drive shafts 22, which are each connected to a screw shaft 13. Each drive shaft 22 is preferably supported on a frame member 23 and rotatably mounted by a journal box 24. Rotation of a drive shaft 22 is transmitted to screw shaft 13 by means of mating bevel gears 25 and 26 attached to the respective shafts, or comparable transmission elements. The upper end of screw shaft 13, below the bevel gear 26, is rotatably mounted as by a collar 27 extending through a support plate 28 and attached thereto by bolts 29 or other suitable fasteners.

The reversible motor 21 is preferably provided with a drag or friction brake 30 operating each time with sufficient uniformity to stop the motor from its operating speed in substantially identical time intervals and numbers of revolutions. The function of the brake 30 and its timed actuation in the operating cycle will be hereinafter described in greater detail in conjunction with the overall operation.

The drive assembly 20 also provides the moving force for an actuator assembly, generally indicated by the numeral 35. Preferably, the relatively high speed of rotation of the drive assembly 20 is reduced to provide a proportional indexing control function, as by a conventional gear reducer 36 which is mounted on the support plate 28. The drive shaft 22 is connected to an input shaft 37 of the gear reducer 36 by a roller chain 38 which engages suitable sprockets 39 and 40 nonrotatably attached to the shafts 22 and 37, respectively. A further degree of speed reduction with resultant power increase may be obtained by having sprockets 39, 40 of different size, as shown. The gear reducer 36 has an output shaft 41 which rotates at a lesser speed than the input shaft 37 but according to a fixed ratio thereof based on the characteristics of the internal gearing in reducer 36.

The rotation of output shaft 41 is converted to a controllably intermittent drive by means of a clutch portion of the actuator assembly 35, generally indicated by the numeral 45. The clutch 45 has a coupling 46 constituting part of a driving section 47 which is attached to and rotates with the output shaft 41 of gear reducer 36 by means of the set screw 46′. The selectively driven part 48 of clutch 45 is attached to a collar 49, which is freely rotatably mounted on the shaft 41 and axially restrained by a set collar 50 held by a set screw 51, and selectively couples and uncouples the shaft 41 and the collar 49. It is desirable that the clutch 45 be capable of driving in both directions and engaging and disengaging with a minimum of slippage.

The collar 49 nonrotatably mounts an actuator sprocket 55 which carries a roller chain 56 having one end 57 attached thereto by a pin 58 and a suspended portion 59 extending vertically downwardly. As viewed in FIG. 2, the chain 56 is fully downwardly extended and the sprocket 55 is restrained from further counterclockwise rotation by a stop block 60 which may be generally L-shaped and attached to project upwardly from the support plate 28. The sprocket 55 has an extending sleeve 61 with an axially extending lug 62 attached thereto, as by suitable welds 62′. The lug 62 may be provided with an adjustment screw 63 which engages the stop block 60 and provides for minor adjustment in the suspended length of roller chain 56.

The roller chain 56 is maintained vertically fully extended by a weight 65 which may be generally cylindrical and is laterally restrained or housed by a hollow cylindrical tube 66 into which it snugly telescopes with minimal frictional resistance. The cylindrical tube 66 is attached to an L-shaped frame member 67 (FIGS. 2 and 3) which may be connected to support plate 28 and is rigidly held by a bolt 68 which may be conveniently passed through the horizontal leg of the frame member 67. In order to preclude the formation of an air pocket or pneumatic bumper which would restrict travel of the weight 65 when it is released after being vertically raised, the bolt 68 may be provided with a small bore 69 which will allow free ingress and egress of air from the lower portion of the tube 66.

The weight 65 is provided, preferably near its upper extremity, with a projecting actuator arm 70 which serves a control function which will be hereinafter described in greater detail. The actuator arm 70 moves linearly axially of the cylindrical tube 66 from the solid line position 70, when the adjustment screw 63 of lug 62 engages stop block 60, upwardly to the chain line position 70′ (FIG. 2) as weight 65 moves to the position 65′. This motion of actuator arm 70 is initiated by coupling of the clutch 45 to rotate sprocket 55, clockwise as viewed in FIG. 2, to engage additional sections of the roller chain 56 and move the lug 62 from the solid line position where screw 63 engages stop block 60 to the chain line position 62″.

Figure 3:
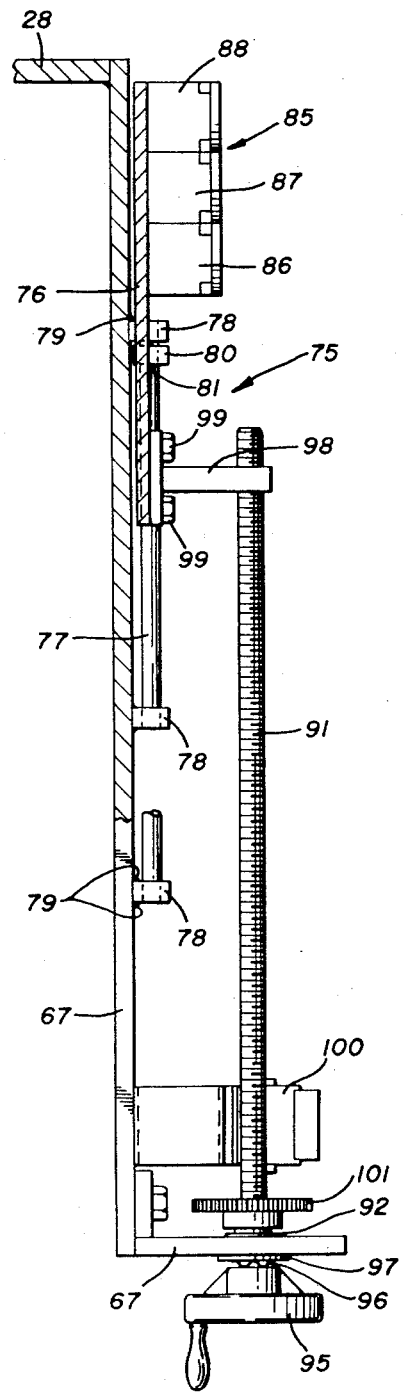
FIG. 3 is a section view taken on line 3—3 of FIG. 2 and showing particularly the construction and mounting of the sliding carriage assembly.

Referring particularly to FIGS. 2 and 3, the indexing apparatus 10 is provided with a movable carriage mechanism, generally indicated by the numeral 75, which cooperates with the actuator assembly 35 to carry out certain control functions. The carriage mechanism 75 has as its primary component a slide plate 76 which is mounted for movement relative to the frame member 67. This relative movement may be conveniently accomplished by guide posts 77 which are attached to and spaced from the vertical portion of frame member 67 by the struts 78 which are attached to the frame member 67 as by fillet welds 79. For simplicity and compactness in positioning the slide plate 76, two guide posts 77 may be provided substantially parallel and spaced approximately the width of slide plate 76. The slide plate 76 is mounted for travel axially of the guide posts 77 by means of support lugs 80 which are attached to slide plate 76, as by fillet welds 81, and bored to slidably engage the guide posts 77. Thus, slide plate 76 may be moved selectively vertically downwardly from its uppermost position depicted in FIGS. 2 and 3 where the right hand support lug 80 engages the upper right hand strut 78.

The slide plate 76 of carriage mechanism 75 mounts one or more control or switching devices, generally indicated by the numeral 85, which are engaged by actuator arm 70 to program the operating sequence of indexing apparatus 10. As shown, three microswitches 86, 87 and 88 are positioned in adjacent relation, each having a projecting arm 89 to which control shoes 90 are attached. The lower switch 86 has a cam knob 90′ which is engaged by the actuator arm 70 to throw the switch. The shoe 90 of switch 86 engages the shoe 90 of switch 87 which in turn engages the shoe 90 of switch 88 to throw the switches 87 and 88, respectively. If desired, the switches 86, 87, 88 may be provided with one or more eccentric shoes 90 in order to provide small time lags between actuation of the various switches. As shown, each of the shoes 90 is center mounted so that the switches 86, 87, 88 are simultaneously thrown with switch 86 providing a holding circuit for reverse indexing, switch 87 deenergizing the electric motor 21, and switch 88 energizing the friction brake 30, all as hereinafter detailed in the discussion of the operation of the apparatus.

The carriage mechanism 75 has slide plate 76 selectively linearly positioned along the guide posts 77 by means of a threaded control rod 91 which is freely rotatably mounted but axially fixed proximate one end to the frame member 67 by a bearing 92. For ease of operation and accurate positioning of slide plate 76, a handwheel 95 may be attached to the end of control rod 91 extending through the horizontal portion of frame member 67. The handwheel 95 may be seated against a spring washer 96 which engages a washer 97 located next to frame member 67 to prevent accidental rotation of handwheel 95 due to vibration of the apparatus. Referring particularly to FIG. 3, the other end of control rod 91 engages a bracket 98 attached to the slide plate 76, as by bolts 99, and bored and threaded to receive the control rod 91. Thus, rotation of control rod 91 causes the slide plate 76 carrying the switching device 85 to move vertically upwardly or downwardly with respect to frame member 67.

To facilitate the fast, accurate indexing for which this apparatus is designed, the control rod 91 may be linked to a counter 100 which depicts the position of the slide plate 76 in terms of the distance the indexed machinery will move during each indexing cycle. Any of the number of conventional counters may be employed; however, a four digit device representing indexed distance in inches and thousandths of an inch is commensurate with the accuracy of the system contemplated. Other types of read-out devices which will serve this function will be readily apparent to persons skilled in the art. A gear drive employing a spur gear 101 attached to control rod 91 and a mating spur gear 102 attached to a shaft 103 of counter 100 is suitable for providing the requisite linkage.

OPERATION

The above-described indexing apparatus operates in the following manner to control the indexed machinery. For purposes of explanation it will be assumed that a workpiece W is to be cut into a plurality of pieces having a uniform selected thickness with the workpiece W being cut when it passes the tool box 12 from right to left in FIGS. 1 and 2, no cutting taking place on the return travel from left to right to complete the cycle.

Initially, the counter 100 is set to the thickness of cut desired by rotating the handwheel 95 which simultaneously linearly positions the slide plate 76 carrying the switching devices 85 after the cutting edge is aligned with the top of the workpiece W. The conveyor 14 then moves the workpiece to the right (FIGS. 1 and 2) until it reaches its extreme right side position where a switch (not shown) initiates the indexing operation by energizing the motor 21 of drive assembly 20 and engaging or coupling the clutch 45 of actuator assembly 35. At this time, the actuator sprocket 55 in the solid line position shown in FIG. 2 with the screw 63 of lug 62 engaging the stop block 60 begins to drive clockwise, as viewed in FIG. 2, to take up the suspended roller chain 56 and raise the weight 65 from its bottomed position in tube 66, while the tool carrier 12 is simultaneously indexed downwardly by rotation of screw shaft 12. When the actuator arm 70 reaches the chain line position 70' and engages the cam knob 90', the switching devices 85 are thrown. Switch 86 establishes a hold circuit on the clutch 45 which maintains it coupled until the switch is released. Switch 87 cuts the circuit supplying power to the motor 21, while switch 88 actuates the friction brake 30 on motor 21 to bring it to a rapid, uniform stop. Since the brake is uniformly applied in each instance, the constant distance the tool carrier 12 indexes after actuation of brake 30 can be compensated for in the reading on counter 100. Thus, the index value set on the counter 100 reflects the distance tool carrier 12 is driven prior to actuation of switches 87 and 88 plus the constant stopping distance. The indexing apparatus may be calibrated originally and periodically with component wear by precisely measuring an indexed distance of tool carrier 12 and setting counter 100 to read this value.

The high degree of accuracy achieved by the indexing apparatus is attributable to numerous factors; however, it should be noted that the weight 65 and actuator arm 70 are displaced a propotrional but much greater distance than the simultaneous vertical movement of tool carrier 12. The various gears and gear reducer 36 cause the actuator arm 70 to move preferably on the order of twice the distance tool carrier 12 moves during an indexing operation; however larger ratios may be advantageously employed to further increase accuracy. Thus, any slight errors in the operation of actuator assembly 35 are significantly reduced by this proportional factor in terms of the vertical indexing of the tool carrier 12.

Subsequent to the indexing operation, the conveyor 14 moves the workpiece W from right to left in FIGS. 1 and 2 past the tool carrier 12 to perform a cutting or other operation. As the conveyor 14 reaches its extreme left hand position on guide rails 15, a switch (not shown) is contacted to initiate a reverse indexing operation by energizing motor 21 of drive assembly 20 in a reverse direction from its rotation during the indexing operation. Since the clutch 45 has remained coupled due to the holding circuit controlled by switch 86, the actuator sprocket 55 begins to drive counterclockwise, as viewed in FIG. 2 to lower the weight 65, while the tool carrier 12 is simultaneously indexed upwardly. When the actuator arm 70 disengages the switching device 85, the holding circuit established by switch 86 is broken, thereby uncoupling the clutch 45 and allowing the weight 65 to freely descend in tube 66 under the influence of gravity to recycle the actuator assembly 35 for subsequent indexing operations. The release of switch 87 also cuts the circuit supplying power to motor 21, while the release of switch 88 actuates the friction brake 30 on motor 21 to achieve a rapid, uniform stop.

It is evident that the reverse indexing operation will drive the tool carrier 12 vertically upwardly only a short distance, since the motor 21 will operate only through the throw of the switching device 85 plus the constant stopping distance of the motor 21. However, a reverse indexing of a few hundred thousandths of an inch is sufficient to provide clearance between the workpiece W and a cutting edge or blade mounted in the tool carrier 12.

The conveyor 14 then moves the workpiece W from left to right in FIGS. 1 and 3 and a new indexing operation commences when the conveyor 14 reaches its extreme right side position, as described above. The entire cycle may be repeated as necessary until the workpiece W is totally severed into pieces of the desired thickness. Since the reverse indexing operation will move the tool carrier 12 a substantially constant distance in all instances, the counter 100 may be calibrated so that the indexing operation will be reflected as the distance to be moved in excess of the reverse index distance or after the tool carrier 12 reaches the position of the prior cut.

The above described structure and operation is particularly suited to cutting operations where the workpiece is a solid, nonflexible material and the blade or cutting edge would tend to interfere with the workpiece W while the conveyor 14 is on its return pass from left to right in FIGS. 1 and 3. Although a reverse indexing operation may be employed when the workpiece W is a more flexible material, this operation may be eliminated in some instances if the machine is to be used exclusively for this type of material.

In constructions without the reverse indexing operation, the switch 86 and its hold circuit may be eliminated and the operation modified as that the clutch 45 is uncoupled allowing the weight 65 to descend in tube 66, thereby recycling the actuator assembly 35, at the time actuator arm 70 engages the remaining two switches 87, 88. In all other respects, the indexing apparatus 10 and the operation thereof would remain identical to that described above, except that motor 21 need not be reversible.

We claim:
1. Apparatus for indexing machine elements comprising, drive assembly means linearly displacing said machine elements, actuator means intermittently connected to said drive assembly means and having a portion displaced linearly and proportionally to a given displacement of said machine elements, carriage means selectively positioned along the travel of said actuator means, and control means on said carriage engaged by said actuator means to stop said drive assembly means and recycle said actuator means for subsequent indexing operations.

2. Apparatus according to claim 1, wherein said actuator means comprises actuator arm means moving linearly and engaging said control means.

3. Apparatus according to claim 2, wherein said actuator means comprises, clutch means connecting said drive assembly means and said acutator arm means when coupled and allowing recycling of said acutator means when uncoupled.

4. Apparatus according to claim 3, wherein said actuator means comprises, sprocket means rotated by said clutch means and chain means suspended from said sprocket means and carrying said actuator arm means.

5. Apparatus according to claim 4, wherein said actuator means comprises, weight means attached to said chain means to rotate said sprocket means and extend said chain means for recycling said actuator means when said clutch means is disengaged.

6. Apparatus according to claim 1, wherein said drive assembly means comprises, a motor and a brake selectively, uniformly retarding the rotation of said motor when deenergized.

7. Apparatus according to claim 6, wherein said control means comprises switch means which deenergize said motor and activate said brake when engaged by said actuator means and which recycles said actuator means.

8. Apparatus according to claim 7, wherein said switch means delays recycling of said actuator means until said actuator means are driven a distance in the direction of recycling and said machine elements are driven a distance opposite the direction displaced during indexing.

9. Apparatus according to claim 1, wherein said carriage means comprises, a slide plate movable relative to said actuator means.

10. Apparatus according to claim 9, wherein said slide plate is selectively positioned by a control rod.

11. Apparatus according to claim 1 having counter means connected to and depicting the position of said carriage means in terms of the distance said machine elements will be displaced during an indexing cycle.

12. Apparatus according to claim 1, wherein said drive assembly comprises an electric motor having an attached friction brake and means connecting said drive assembly and said machine elements for indexing displacement thereof, said actuator means comprises a gear reducer connected to said drive assembly, a sprocket driven by said gear reducer, a clutch interposed between said gear reducer and said sprocket for controlled, intermittent drive of said sprocket, a chain engaging and suspended from said sprocket, an actuator arm attached to said chain, a weight attached to said chain to rotate said sprocket and extend said chain for recycling said actuator means when said clutch is disengaged, a stop limiting the rotation of said sprocket and the extension of said chain, said carriage means comprises a slide plate movable relative to said actuator means, a fixed control rod engaging and selectively positioning said slide plate, and a counter connected to said carriage means and calibrated to indicate the distance said machine elements will be displaced during an indexing cycle, and said control means comprises at least one switch which deenergizes said electric motor, activates said friction brake, and uncouples said clutch when engaged by said actuator arm.

References Cited
UNITED STATES PATENTS 2,763,191   9/1956   Wells _____ 192—143 XR
3,263,537   8/1966   Rehman et al. _____ 83—4

CARLTON R. CROYLE, Primary Examiner

A. D. HERRMANN, Assistant Examiner

U.S. Cl. X.R.

83—4, 409, 437; 192—94, 144